US009307605B2

(12) United States Patent
Schoegler et al.

(10) Patent No.: US 9,307,605 B2
(45) Date of Patent: Apr. 5, 2016

(54) ELECTRONIC LIGHTING SYSTEM AND METHOD FOR LIGHTING SYNCHRONIZATION (71) Applicant: ams AG, Unterpremstaetten (AT)

(72) Inventors: Werner Schoegler, Graz (AT); Manfred Pauritsch, Graz (AT)

(73) Assignee: ams AG, Unterpremstaetten (AT)

( * ) Notice: Subject to any disclaimer, the term of this patent is extended or adjusted under 35 U.S.C. 154(b) by 0 days.

(21) Appl. No.: 14/760,460

(22) PCT Filed: Nov. 29, 2013

(86) PCT No.: PCT/EP2013/075126
§ 371 (c)(1),
(2) Date: Jul. 10, 2015

(87) PCT Pub. No.: WO2014/108249
PCT Pub. Date: Jul. 17, 2014

(65) Prior Publication Data
US 2015/0359063 A1 Dec. 10, 2015

(30) Foreign Application Priority Data

Jan. 11, 2013 (EP) .................................... 13151016

(51) Int. Cl.
*H05B 33/08* (2006.01)
*H05B 37/02* (2006.01)
(52) U.S. Cl.
CPC ........ *H05B 33/0851* (2013.01); *H05B 33/0815* (2013.01); *H05B 37/0272* (2013.01)
(58) Field of Classification Search
CPC ........... H05B 33/0851; H05B 33/0815; H05B 37/0272; H05B 33/0845

USPC .................. 315/151, 155, 150, 186, 210
See application file for complete search history.

(56) References Cited

U.S. PATENT DOCUMENTS

| 5,193,201 | A | 3/1993 | Tymes | |
|---|---|---|---|---|
| 8,159,150 | B2* | 4/2012 | Ashdown | H05B 33/0818 315/149 |
| 8,552,659 | B2* | 10/2013 | Ashdown | H05B 33/0869 315/291 |
| 2010/0091048 | A1 | 4/2010 | Aitken et al. | |
| 2010/0289426 | A1 | 11/2010 | Takasaka et al. | |

(Continued)

FOREIGN PATENT DOCUMENTS

WO 2007/121574 A1 11/2007
WO 2012/146256 A2 11/2012

*Primary Examiner* — Daniel D Chang
(74) *Attorney, Agent, or Firm* — McDermott Will & Emery LLP (57) ABSTRACT In one embodiment, an electronic lighting system comprises a first light source (L1) adapted to emit light with a first brightness as a function of a first driving signal (PWM1) having a first frequency (f1), at least one second light source (L2) having a main light sensor (Als2) for providing an brightness of light surrounding the second light source (L2), wherein the first light source (L1) is arranged in visual connection with the at least one second light source (L2). Thereby, the second light source (L2) is prepared to emit light with a second brightness as a function of a second driving signal (PWM2) with a second frequency (f2), the second frequency (f2) of the second driving signal (PWM2) being adjusted to a light frequency (fL) of the light emitted by the first light source (L1), the light frequency (fL) being detected by means of the main light sensor (Als2). Furthermore, a method for lighting synchronization is described.

13 Claims, 4 Drawing Sheets

(56) References Cited

U.S. PATENT DOCUMENTS

| | | |
|---|---|---|
| 2010/0327764 A1 | 12/2010 | Knapp |
| 2011/0121761 A1 | 5/2011 | Zhao |
| 2011/0253915 A1 | 10/2011 | Knapp |
| 2012/0001567 A1 | 1/2012 | Knapp et al. |
| 2012/0310703 A1 | 12/2012 | Cavalcanti et al. |

* cited by examiner

ELECTRONIC LIGHTING SYSTEM AND METHOD FOR LIGHTING SYNCHRONIZATION

The application refers to an electronic lighting system and to a method for lighting synchronization.

BACKGROUND OF THE INVENTION

Light-emitting diodes, LEDs, are used more and more in the field of architectural lighting. One of their main advantages is that LEDs can be dimmed precisely and efficiently according to various needs. By this, light colour and light brightness, for instance, can be adjusted, also taking into account ambient light conditions.

The present application refers to light sources based on LEDs which are operated by constant current sources driven with a pulse-width-modulated signal.

As soon as more than one light source are mounted in a single room, each light source is driven with a slightly different frequency and/or phase. The use of various frequencies in various lights leads to a slow overall variation of the phase relationship between the frequencies, which causes sub-harmonics or beat frequencies. These beat frequencies have an adverse effect on human beings.

It is therefore an objective to provide an electronic lighting system and a corresponding method which overcome the described deficiencies.

The objective is achieved by the subject matter of the independent patent claims. Embodiments and developments are subject matter of the dependent claims.

SUMMARY OF THE INVENTION

In one embodiment, an electronic lighting system comprises a first light source and at least one second light source. The first light source and the at least one second light source are arranged in visual connection with each other. The first light source is adapted to emit light with a first brightness as a function of a first driving signal having a first frequency. The at least one second light source has a main light sensor for providing a brightness of light surrounding the second light source. Thereby, the second light source is prepared to emit light with a second brightness as a function of a second driving signal with a second frequency. The second frequency of the second driving signal is adjusted to a light frequency of the light emitted by the first light source. The light frequency is detected by means of the main light sensor. The light frequency of the light emitted by the first light source is a function of the first frequency of the first driving signal.

The first light source is switched on and emits light with a first brightness according to the first driving signal with the first frequency. The main light sensor within the second light source checks within a specified frequency range for other lights working in the same room. The main light sensor detects the light emitted by the first light source, especially the light frequency of the emitted light. The second frequency of the second driving signal is adjusted to the detected light frequency within the second light source. Subsequently, the second light source is activated and emits light with the second brightness according to the second driving signal using the second frequency.

The second frequency used to drive the second light source is adjusted to the detected light frequency of light emitted by the first light source. The light frequency of the light emitted by the first light source corresponds to the first frequency used in driving the first light source. Consequently, the second frequency used within the at least one second light source is synchronized with the first frequency used within the first light source. This results in a synchronization of first and second driving signals at least with respect to the value of the respective frequency. A constant phase difference between first and second driving signals at this synchronized frequency wherein the second driving signal is delayed with respect to the first driving signal may also arise. Preferably, first and second driving signals are in synchronization regarding the value of the respective frequency and phase.

Advantageously, when overlaying these two frequencies, no sub-harmonics or beat frequencies arise. Human beings feel much more comfortable in rooms where the proposed electronic lighting system has been installed.

First and second light sources are arranged in visual connection with each other, i.e. in line of sight with each other. They can also be installed in one single room.

The first and second light sources each employ one or more LEDs. These LEDs are driven by first and second driving signals, respectively, for which a pulse-width-modulated signal is used in each case. The brightness of the light emitted by each of the LEDs is a function of a ratio of on-time to off-time of the respective pulse-width-modulated driving signal.

Thereby, the first light source can be configured as a master device, whereas the at least one second light source and each further light source using the same implementation as the at least one second light source can be configured as slave devices.

The characteristic frequency range in which the at least one second light source checks, by means of its main light sensor, for other light sources present is in the range of its own frequency. The own frequency is a pre-defined frequency which is generally used for driving the kind of LEDs employed in the light source. For example, the at least one second light source checks in the range of 10 Hz to 1 KHz.

Brightness is a term that describes how intense a light source is perceived by the human eye. Brightness is measured in the units called "LUX".

In a further development, the first light source comprises a first control unit and a first driver circuit connected to an output of the first control unit. The first control unit is prepared to generate the first driving signal with a first duty cycle as a function of the first brightness. The first driver circuit is prepared to be connected to at least one light-emitting diode and is further prepared to drive the at least one light-emitting diode as a function of the first driving signal.

The first control unit generates the first driving signal, which is used within the first driver circuit to drive connected LEDs.

The duty cycle is thereby defined as the ratio between the on-time or the active period of the first driving signal and its total period.

In a further embodiment, the first light source comprises an additional light sensor which is adapted to measure a brightness of light surrounding the first light source and to provide a first sensor signal as a function of the measured brightness. The first driving signal is adapted as a function of the first sensor signal.

By means of the additional light sensor in the first light source, light emitted by the first light source can be adapted to ambient light conditions.

In an exemplary implementation, the additional light sensor of the first light source is used to measure brightness during the off-time of the period of the first driving signal, which is pulse-width-modulated.

In another embodiment, the first light source comprises a first communication module for providing an adjusted first driving signal such that at least one additional light pulse representing at least one control parameter is emitted by the first light source during an off-period of the first driving signal.

Said off-period of the first driving signal is advantageously used for sending the at least one control parameter to the at least one second light source. As the off-periods of the first and second driving signals are taking place at the same point in time as the first and second driving signals are synchronized with each other, the control parameter sent by the first light source can be detected by the first light source also during the off-time of its second driving signal.

One example of a control parameter is the colour temperature. For sending the at least one control parameter from the first light source to other light sources present in the same room, especially the at least one second light source, visual communication, for instance according to the standard IEEE 802.15.7, is employed as to the knowledge of a person skilled in the art.

In a further development, the first communication module comprises a coding unit, and a modulation unit which is coupled to an output of the coding unit. The coding unit provides a coded signal as a function of the first driving signal and the control parameter supplied by a data signal. The modulation unit is prepared to provide the adjusted first driving signal as a function of the coded signal.

The control parameter supplied via the data signal is encoded in the coding unit using the first driving signal. The obtained coded signal is modulated into the adjusted first driving signal. The adjusted first driving signal is provided to the first driver circuit resulting in short activation of the connected LEDs during the off-time of the first driving signal. The coding unit uses, for instance, Manchester coding to guarantee clock transmission. The modulation unit employs, for example, amplitude modulation to transfer the desired information, here the control parameter. The main light sensor used in the second light source and the additional light sensor used in the first light source can be implemented for example using a photodiode. This photodiode can be connected to an amplifier and respective signal processing. Each light sensor consequently provides at least the frequency of the light surrounding the sensor and the brightness reflected in the amount of current output by the sensor. A light sensor is also denoted an ambient light sensor.

In an exemplary implementation, the control parameter is supplied by the first control unit. In another example, the additional light sensor of the first light source measures the ambient light, from which the first control circuit determines a colour temperature according to the time of day and transmits the colour temperature to other light sources arranged in the same room.

In another embodiment, the second light source comprises a second control unit and a second driver circuit connected to an output of the second control unit. The second control unit is coupled to an output of the main light sensor and is prepared to generate the second driving signal. The second driver circuit is prepared to be connected to at least one light-emitting diode and to drive the at least one light-emitting diode as a function of the second driving signal. The main light sensor is adapted to provide a second sensor signal as a function of the detected light frequency and a detected brightness of the light emitted by the first light source.

The main light sensor provides the second sensor signal as a function of the detected light frequency of the light emitted by the first light source and as a function of the detected brightness of the light emitted by the first light source. The second control unit generates the second driving signal as a function of information provided via the second sensor signal. The second driver circuit uses the second driving signal to operate connected LEDs.

By means of the main light sensor, the second driving signal can be adapted in its frequency to the first frequency of the first driving signal. Furthermore, other parameters, like the colour temperature, can be adapted to the parameter used within the first light source which is received by the main light sensor.

In a development, the second light source further comprises a second communication module which is connected between the main light sensor and the second control unit. The second communication module is further prepared to provide a modified second sensor signal comprising the at least one control parameter emitted by the first light source.

In a development, the second communication module comprises a demodulation unit, a clocking unit coupled to an output of the demodulation unit, and a decoding unit coupled to an output of the clocking unit. The demodulation unit provides a demodulated signal as a function of the second sensor signal. The clocking unit provides a received data signal as a function of the demodulated signal and a clocking signal. The decoding unit provides the modified second sensor signal as a function of the received data signal and the clocking signal.

The second communication module together with its units implements all the functionality necessary for communication with the first communication module within the first light source, especially for receiving the at least one control parameter. A light signal comprising the control parameter is detected in the main light sensor and is propagated by means of the second sensor signal. The demodulation unit demodulates the second sensor signal and provides the demodulated signal. The clocking unit therefrom recovers the clock into the clocking signal and provides the received data signal. The decoding unit decodes the at least one control parameter from the received data signal using the clocking signal and provides the modified second sensor signal.

Using the at least one control parameter conveyed within the modified second sensor signal, the second control unit is enabled to adapt the second frequency of the second driving signal or an amount of current provided within the second driver circuit.

The transmission and reception of the at least one control parameter are effected during the synchronized off-periods of first and second driving signals.

The first and second driver circuits are each implemented by at least one controlled current source, for example. The controlled current source is controlled by the respective driving signal.

In one embodiment, a method for lighting synchronization comprises the following steps:
  generating a first driving signal having a first frequency within a first light source,
  activating the first light source to emit light with a first brightness as a function of the first driving signal,
  measuring a light frequency of the light emitted by the first light source within a second light source which is in visual connection with the first light source,
  generating a second driving signal having a second frequency within the second light source,
  adjusting the second frequency to the measured light frequency, and
  activating the second light source to emit light with a second brightness as a function of the second driving signal, wherein the light frequency of the light emitted by the first light source is a function of the first frequency of the first driving signal.

Advantageously, LED based light sources within one room are synchronized in terms of pulse width modulation frequencies used within these light sources by means of the described method. Well being of persons in this room is enhanced.

In a development the method further comprises:
transmitting at least one control parameter by the first light source using visual light communication,
receiving the at least one control parameter by the second light source using a main light sensor,
wherein the acts of transmitting and receiving are effected during an off-period of the first driving signal.

As the off-period of the first driving signal is synchronous to, e.g. taking place concurrently with, the off-period of the second driving signal, during this off period the ambient light can be measured. Subsequently, brightness of the light sources can be set according to actual demand. Advantageously, thereby the sum of ambient light and artificial light, e.g. the light emitted by the light sources, can be kept constant and an optimum of energy saving is achieved. In addition, driving signals of first and second light sources can be re-synchronized from time to time.

BRIEF DESCRIPTION OF THE DRAWINGS

The text below explains aspects of the invention in detail using exemplary embodiments with reference to the drawings. Components and circuit elements that are functionally identical or have the identical effect bear identical reference numbers. In so far as circuit parts or components correspond to one another in function, a description of them will not be repeated in each of the following figures. Therein.

DETAILED DESCRIPTION

Figure 1:
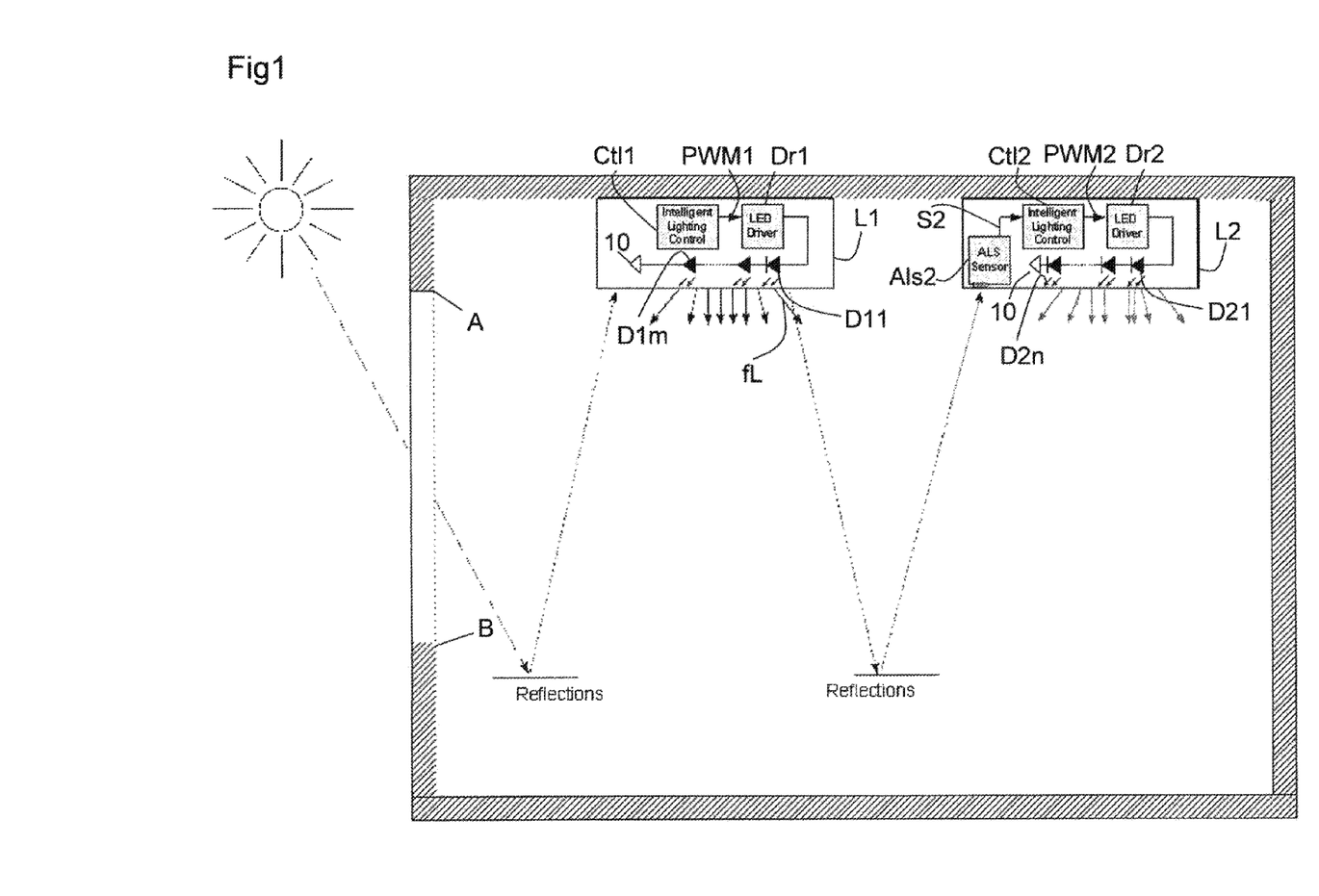
FIG. 1 shows an exemplary embodiment of an electronic lighting arrangement according to the proposed teaching.

FIG. 1 shows an exemplary embodiment of the electronic lighting arrangement according to the proposed teaching. A first light source L1 and a second light source L2 are arranged in one room. This room has a window extending between points A and B. The first light source L1 comprises a first control unit Ctl1 and a first driver circuit Dr1. The first light source L1 further has a number m of LEDs D11, D12, ..., D1$m$ connected in series to the first driver circuit DR1.

The first control unit Ctl1 provides a first driving signal PWM1 to the first driver circuit Dr1. The first driver signal PWM1 is a pulse width modulated signal having a first frequency f1. The first driver circuit Dr1 drives the connected LEDs D11, ..., D1$m$ using the first driving signal PWM1. Thereby, LEDs D11, ..., D1$m$ are connected in series to each other, the first LED D11 being connected to an output of the first driver circuit Dr1. The LEDs D11, ..., D1$m$ are referred to a reference potential terminal 10.

The second light source L2 comprises a main light sensor Als2, a second control unit Ctl2 and a second driver circuit Dr2. The second light source L2 has a number n of LEDs D21, D22, ..., D2$n$ which are connected in series to each other at an output of the second driver circuit Dr2. The LEDs D21, ..., D2$n$ are likewise referred to the reference potential terminal 10.

The main light sensor Als2 provides a second sensor signal S2 as a function of a brightness of light surrounding the second light source L2 to the second control unit Ctl2. The second control unit Ctl2 provides a second driving signal PWM2 as a function of the second sensor signal S2. The second driver circuit Dr2 controls the connected diodes D21, ..., D2$n$ using the second driving signal PWM2.

The first light source L1 is switched on first. It emits light with a first brightness as a function of the first driving signal PWM1. The light emitted by the first light source L1 accordingly has a light frequency fL. The second light source L2 senses for ambient light within characteristic frequencies in the range of its own second driving signal PWM2 by means of the main light sensor Als2. It detects the light frequency fL of the light emitted by the first light source L1. The second light source L2 subsequently adapts a second frequency f2 of the second driving signal PWM2 to the detected light frequency fL. A frequency reference used within the second light source L2 to generate the second frequency f2 of the second driving signal PWM2 is adjusted to be synchronous with the sensed light frequency fL. As soon as this synchronization is achieved, the second light source L2 turns on its LEDs D21, ..., D2$n$.

As the light frequency fL emitted by LEDs D11, ..., D1$m$ of the first light source L1 is a function of the first frequency f1 of the first driving signal PWM1, the second frequency f2 used within the second driving signal PWM2 is synchronized to the first frequency f1. Thereby, advantageously adverse effects resulting from beat frequencies of sub-harmonics of LED lights driven with slightly different frequencies, seen as flickering by human beings in the room, are avoided.

Figure 2:
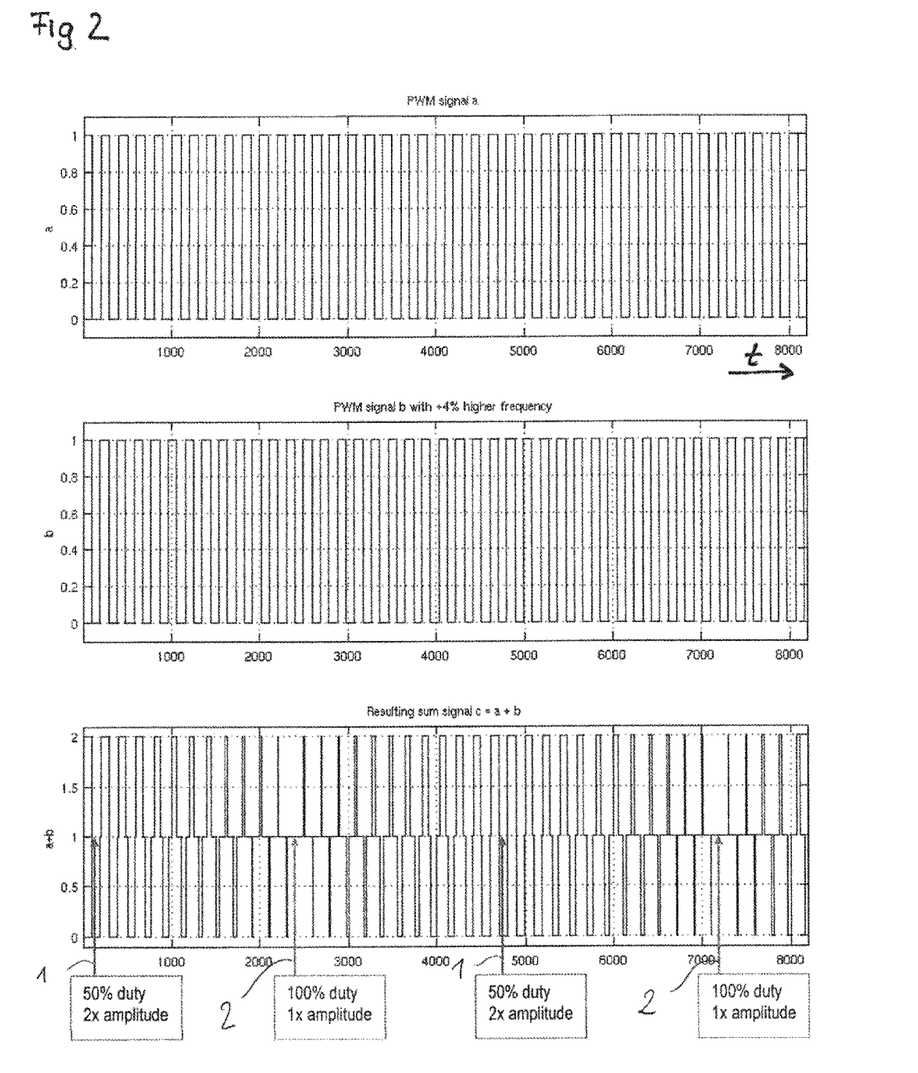
FIG. 2 shows signal diagrams referring to the state of the art LED lighting.

FIG. 2 shows signal diagrams referring to state of the art LED lighting. Every signal is depicted as progression over time of amplitude for a pulse width modulated signal. The top diagram shows the progression of signal a which is used for driving a first LED light. The diagram in the middle presents the progression of signal b which is used for driving a second LED light. The frequency of signal b is 4% higher than the frequency of signal a. The diagram in the bottom shows a progression of the resulting sum signal c of signal a and signal b. This resulting signal c is experienced by a person in the room together with the first and the second LED lights.

As can be seen, the slight difference of frequencies between signal a and signal b generates a slow variation of the duty cycle of the resulting sum signal c. Arrows 1 indicate points where the duty cycle of the sum signal c is 50% and the amplitude is double the amplitude of signal a and b. Arrows 2 indicate points where the duty cycle of the sum signal c is 100%, whereas the amplitude is only at 1. This results in a beat frequency which is defined by the difference of the frequencies used in signals a and b according to the following equation:

$$f\text{beat} = fb - fa$$

Therein, fbeat represents the beat frequency, fa represents the frequency of the signal a and fb represents the frequency of the signal b.

This beat frequency fbeat results in flicker which has adverse effects on human wellbeing.

This signal diagrams show state of the art implementations and are only used for reasons of comparison to demonstrate the effect of the described electronic lighting system.

Figure 3:
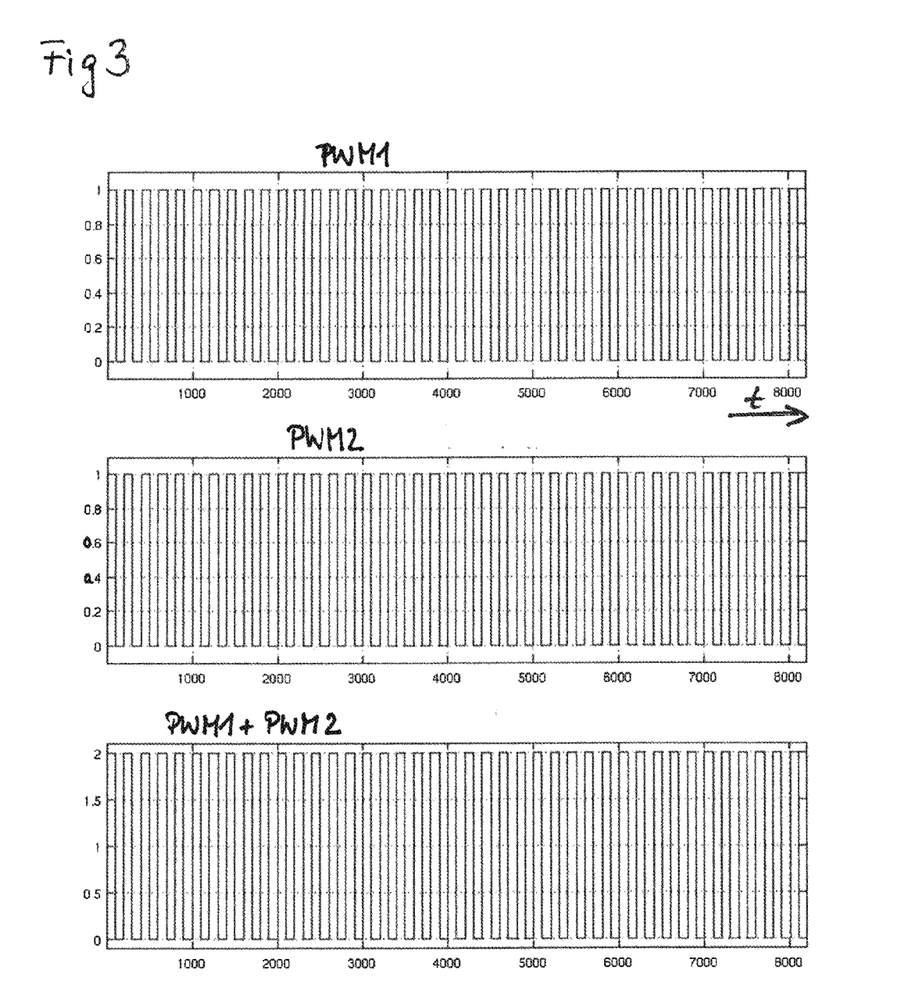
FIG. 3 shows signal diagrams referring to the embodiment of FIG. 1.

FIG. 3 shows signal diagrams referring to the embodiment depicted in FIG. 1. The top diagram shows progression over time of the first driving signal PWM1 used in the first light source L1. The diagram in the middle shows the progression of the second driving signal PWM2 used within the second light source L2. The diagram in the bottom shows the resulting sum signal of first driving signal PWM1 and second driving signal PWM2 as experienced by a person in the same room with first and second light sources L1, L2.

As the frequencies of the first and the second driving signal PWM1, PWM2 are synchronized with each other as described above, no beat frequencies occur in the summation of the first and the second driving signals PWM1, PWM2. This enhances the wellbeing of persons confronted with first and second light sources L1, L2.

Synchronized off periods of the first and the second driving signal PWM1, PWM2 can be discerned at time intervals in which the sum signal in the bottom diagram has an amplitude value of zero.

Figure 4:
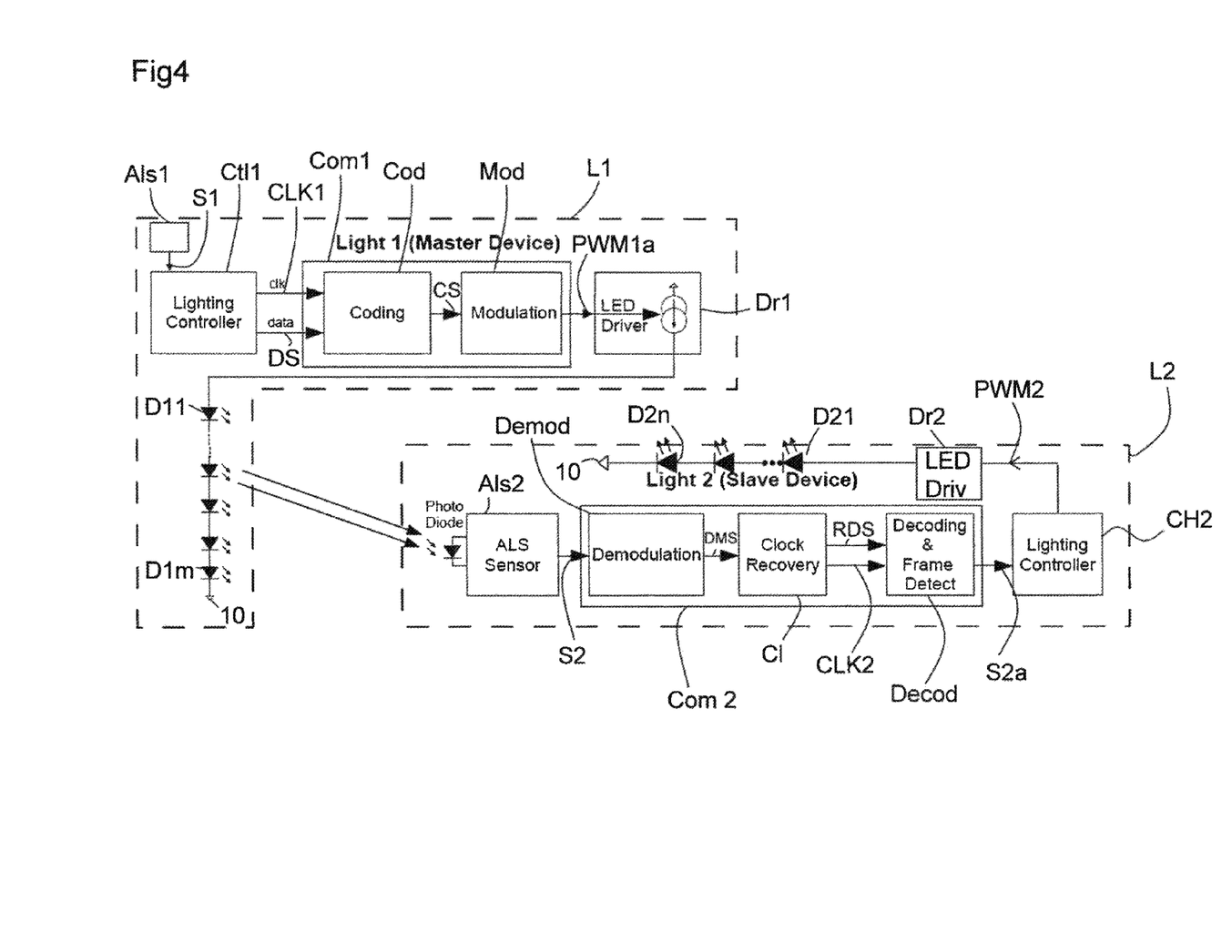
FIG. 4 shows a second exemplary embodiment of an electronic lighting arrangement according to the proposed teaching.

FIG. 4 shows a second exemplary embodiment of the electronic lighting arrangement according to the proposed teaching. This embodiment is based on the same components as the embodiment of FIG. 1. Extra components are added to achieve additional functionality. As in FIG. 1, first and second light sources L1, L2 are mounted in the same room in visual connection with each other.

The first light source L1 has an additional light sensor Als1 connected to an input of the first control unit Ctl1. The additional light sensor Als1 provides a first sensor signal S1 as a function of a measured brightness of light surrounding the first light source L1. The first light source L1 also comprises a first communication module Com1. The first communication module Com1 is connected to outputs of the first control unit Ctl1. The first control unit Ctl1 is further adapted to provide a first clock signal CLK1 and a data signal DS which comprises at least one control parameter to the first communication module Com1. The first communication module Com1 is adapted to provide an adjusted first driving signal PWM1a such that at least one additional light pulse representing the at least one control parameter is emitted by the first light source L1 during an off period of the first driving signal PWM1.

The first communication module Com1 comprises a coding unit Cod, and a modulation unit Mod coupled to an output of the coding unit Cod. The coding unit Cod provides a coded signal CS as a function of the first clock signal CLK1 and the control parameter supplied by the data signal DS. The modulation unit Mod provides the adjusted first driving signal PWM1a as a function of the coded signal CS.

The second light source L2 comprises, in addition to the embodiment of FIG. 1, a second communication module Com2 which is connected between the main light sensor Als2 and the second control unit Ctl2. The second communication module Com2 receives the second sensor signal S2 and therefrom provides a modified second sensor signal S2a comprising the at least one control parameter emitted by the first light source L1 and sensed by means of the main light sensor Als2.

In detail, the second communication module Com2 comprises a demodulation unit Demod, a clocking unit Cl and a decoding unit Decod. The demodulation unit Demod provides a demodulated signal DMS as a function of the second sensor signal S2. The clocking unit Cl is coupled to an output of the demodulation unit Demod. The clocking unit Cl is prepared to provide a received data signal RDS as a function of the demodulated signal DMS and a second clock signal CLK2. The decoding unit Decod is coupled to outputs of the clocking unit Cl. The decoding unit Decod is prepared to provide the modified second sensor signal S2a as a function of the received data signal RDS and the second clock signal CLK2.

The additional light sensor Als1 in the first light source L1 senses light surrounding the first light source L1 and provides respective measured values within the first sensor signal S1. During off periods of the first driving signal PWM1 ambient light can be sensed. During on periods of the first driving signal PWM1, i.e. when the LEDs D11, ..., D1n are switched on, colour temperature is measured. The first control unit Ctl1 determines from the first sensor signal S1 a control parameter which is to be transmitted to other light sources in the same room, here the second light source L2. The control parameter indicative of e.g. a light temperature or a synchronisation parameter is provided to the first communication module Com1 by means of the data signal DS together with a respective clock represented by the first clock signal CLK1. The control parameter is encoded, e.g. using Manchester coding, in the coding unit Cod and modulated, e.g. amplitude modulated, in the modulation unit Mod. During an off-period of the first driving signal PWM1, the control parameter is sent to the second light source by shortly switching on LEDs within the first light source L1 according to the modified first driving signal PWM1a.

During the corresponding synchronized off period of the second driving signal PWM2, the main light sensor Als2 within the second light source L2 senses for ambient light and detects the additional pulses sent out by the first light source L1. These pulses are demodulated in the demodulation unit Demod, decoded according to a second clock signal CLK2 recovered in the clocking unit Cl and provided as modified second sensor signal S2a to the second control unit Ctl2. The second control unit Ctl2 can adapt its second driving signal PWM2 according to the received control parameter.

By this, advantageously a resynchronization of first and second light sources L1, L2 can be achieved during off periods of the synchronized driving signals PWM1, PWM2. In addition, other parameters, e.g. color temperature, can be adjusted to values measured and provided by the first light source L1.

Furthermore, changes in ambient light due to time of day can be sensed by the first light source L1. Brightness of the LEDs within L1 and L2 can be adapted accordingly. For instance, light coming in by a window, e.g. the window AB in FIG. 1, is measured by the additional light sensor Als1 in the first light source L1. Brightness of the LEDs in the first light source L1 is adjusted by setting the duty cycle of the first driving signal PWM1. A suitable control parameter is subsequently sent to the second light source L2 which in turn can adapt its second driving signal PWM2.

In an alternative embodiment, power line communication is used to transmit control parameters from first to second light source L1, L2.

The invention claimed is:

1. An electronic lighting system comprising
a first light source adapted to emit light with a first brightness as a function of a first driving signal having a first frequency, and
at least one second light source having a main light sensor for providing a brightness of light surrounding the second light source,
wherein the first light source is arranged in visual connection with the at least one second light source, and
wherein the second light source is prepared to emit light with a second brightness as a function of a second driving signal with a second frequency, the second frequency of the second driving signal being adjusted to a light frequency of the light emitted by the first light source, the light frequency being detected by means of the main light sensor, and wherein the light frequency of the light emitted by the first light source is a function of the first frequency of the first driving signal.

2. The electronic lighting system according to claim 1, wherein the first light source comprises
a first control unit which is prepared to generate the first driving signal with a first duty cycle as a function of the first brightness, and
a first driver circuit connected to an output of the first control unit, the first driver circuit being prepared to be connected to at least one light-emitting diode and to drive the at least one light-emitting diode as a function of the first driving signal.

3. The electronic lighting system according to claim 1, wherein
the first light source comprises an additional light sensor which is adapted to measure a brightness of light surrounding the first light source and to provide a first sensor signal as a function of the measured brightness, and
the first driving signal is adapted as a function of the first sensor signal.

4. The electronic lighting system according to claim 1, wherein the first light source comprises a first communication module for providing an adjusted first driving signal such that at least one additional light pulse representing at least one control parameter is emitted by the first light source during an off-period of the first driving signal.

5. The electronic lighting system according to claim 4, wherein the first communication module comprises
a coding unit which provides a coded signal as a function of a first clock signal and the control parameter supplied by a data signal, and
a modulation unit which is coupled to an output of the coding unit, the modulation unit being prepared to provide the adjusted first driving signal as a function of the coded signal.

6. The electronic lighting system according to claim 1, wherein the second light source comprises
a second control unit which is coupled to an output of the main light sensor and which is prepared to generate the second driving signal, and
a second driver circuit connected to an output of the second control unit, the second driver circuit being prepared to be connected to at least one light-emitting diode and to drive the at least one light-emitting diode as a function of the second driving signal,
and wherein the main light sensor is adapted to provide a second sensor signal as a function of the detected light frequency and a detected brightness of the light emitted by the first light source.

7. The electronic lighting system according to claim 4, wherein the second light source further comprises a second communication module which is connected between the main light sensor and the second control unit, the second light source being prepared to provide a modified second sensor signal comprising the at least one control parameter emitted by the first light source.

8. The electronic lighting system according to claim 7, wherein the second communication module comprises
a demodulation unit for providing a demodulated signal as a function of the second sensor signal,
a clocking unit coupled to an output of the demodulation unit, the clocking unit being prepared to provide a received data signal as a function of the demodulated signal and a second clock signal, and
a decoding unit coupled to an output of the clocking unit, the decoding unit being prepared to provide the modified second sensor signal as a function of the received data signal and the second clock signal.

9. A method for lighting synchronization comprising the following steps:
generating a first driving signal having a first frequency within a first light source,
activating the first light source to emit light with a first brightness as a function of the first driving signal,
measuring a light frequency of the light emitted by the first light source within a second light source which is in visual connection with the first light source,
generating a second driving signal having a second frequency within the second light source,
adjusting the second frequency to the measured light frequency, and
activating the second light source to emit light with a second brightness as a function of the second driving signal,
wherein the light frequency of the light emitted by the first light source is a function of the first frequency of the first driving signal.

10. The method according to claim 9, further comprising:
measuring a brightness of light surrounding the first light source within the first light source during an off-period of the first driving signal, and
adapting the first driving signal as a function of the measured light brightness.

11. The method according to claim 9, further comprising:
transmitting at least one control parameter by the first light source using visual light communication, and
receiving the at least one control parameter by the second light source using a main light sensor,
wherein the acts of transmitting and receiving are effected during an off-period of the first driving signal.

12. The method according to claim 11,
the act of transmitting comprising:
encoding the at least one control parameter,
modulating the encoded control parameter, and
emitting light using the modulated encoded control parameter.

13. The method according to claim 12,
the act of receiving comprising:
demodulating the at least one modulated encoded control parameter,
decoding the encoded control parameter,
recovering a clock signal, and
providing a modified second sensor signal as a function of the at least one control parameter.

* * * * *